United States Patent [19]

Sakai et al.

[11] Patent Number: 4,538,892

[45] Date of Patent: Sep. 3, 1985

[54] AUTOMATIC FOCUS CONTROL SYSTEM

[75] Inventors: Shinji Sakai; Yoshihito Harada, both of Tokyo; Akira Ishizaki, Yokohama; Takashi Kawabata, Kamakura, all of Japan

[73] Assignee: Canon Kabushiki Kaisha, Tokyo, Japan

[21] Appl. No.: 515,617

[22] Filed: Jul. 20, 1983

[30] Foreign Application Priority Data

Jul. 28, 1982 [JP] Japan ................................. 57-130395

[51] Int. Cl.³ .............................................. G03B 13/18
[52] U.S. Cl. ..................................... 354/402; 354/409
[58] Field of Search .................................. 354/402, 409

[56] References Cited

U.S. PATENT DOCUMENTS 4,091,275  5/1978  Wilwerding ........................ 250/201

Primary Examiner—L. T. Hix
Assistant Examiner—David M. Gray
Attorney, Agent, or Firm—Fitzpatrick, Cella, Harper & Scinto

[57] ABSTRACT

This specification discloses an energizing control of a drive element for driving a motor or the like which drives a focusing lens. The energization is controlled on the basis of the detection of whether or not the position of the focusing lens is within the quasi-in-focus state, and when the continuation of the quasi-in-focus state for a predetermined time period or more is detected, energization of the driving element is stopped.

3 Claims, 4 Drawing Figures

AUTOMATIC FOCUS CONTROL SYSTEM

BACKGROUND OF THE INVENTION

1. Technical Field of the Invention

The present invention relates to an automatic focus control system for a camera or the like, and more particularly to an energizing control of drive means for driving a focusing lens.

2. Prior Art of the Invention

In the conventional automatic focusing control system, in-focus ranges are generally set to be fairly narrow for better focusing precision. However, if the is-focus range in narrow, and the focus adjustment is to be performed manually, it may be difficult to fix the lens position within the in-focus range, degrading the operability of the camera. To solve the problem, there has been already proposed a system in which a quasi-in-focus range which is wider than the in-focus range is defined and when the lens is displaced into the quasi-in-focus range, an indicator indicates such state. On one hand, there has also been conventionally proposed a system in which once the lens position has been fixed within the in-focus range, further focus adjustment is not executed even if the lens position becomes out of the in-focus range thereafter. However, in these systems, the focus adjustment is not terminated until the lens position is fixed into the narrow in-focus range, therefore, it requires much time to fix the lens position within the in-focus range, due to camera shake or the like. In such a case, even if the lens is in the quasi-in-focus state, the focus adjustment operation is not completed. Therefore, the lens driving operation is continued, which leads to poor operability of the camera.

SUMMARY OF THE INVENTION

A first object of the present invention is to provide a focus control system in which, when a focusing lens is at a position within the quasi-in-focus range, or when it is moved to a position in such a state, driving of the focusing lens is stopped, and in which particularly when the focusing lens is continuously in the quasi-in-focus state for a predetermined period of time or more, energization of the drive means is stopped, thereby preventing unnecessary lens driving operation.

A second object of the present invention is to provide an automatic focus control system wherein, when a signal is detected which signal represents that the focusing state of an object to be photographed through a focusing lens is within the quasi-in-focus state(which is near the in-focus state so that no trouble will be practicably caused in taking a picture), and when this quasi-in-focus state continues for a predetermined period of time or more, power supply to the drive means is stopped and energization to the motor is also stopped.

A third object of the present invention is to provide an automatic focus control system in which the energization time for the drive means such as a motor or the like can be minimized, whereby the consumption of power energy is suppressed.

DESCRIPTION OF THE PREFERRED EMBODIMENTS

Figure 1A:
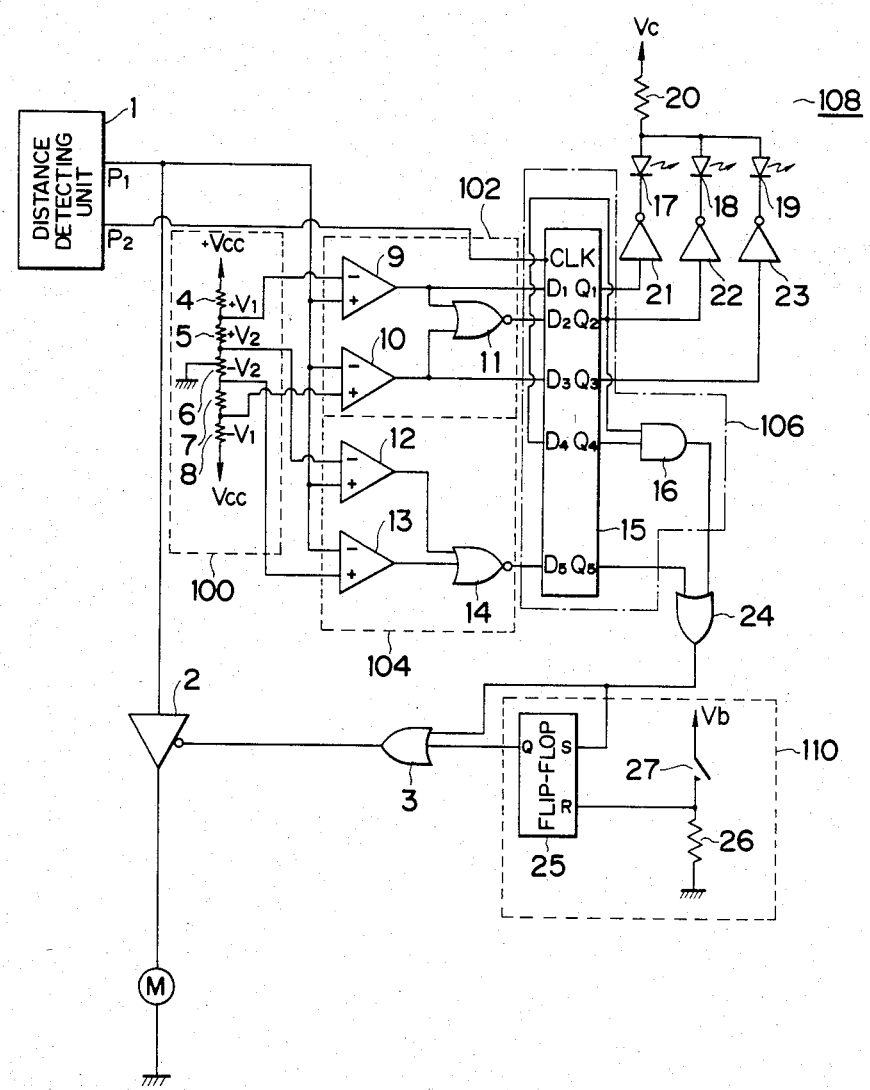
FIG. 1A shows a circuit diagram of the principal part of one embodiment of the present invention.
Figure 1B:
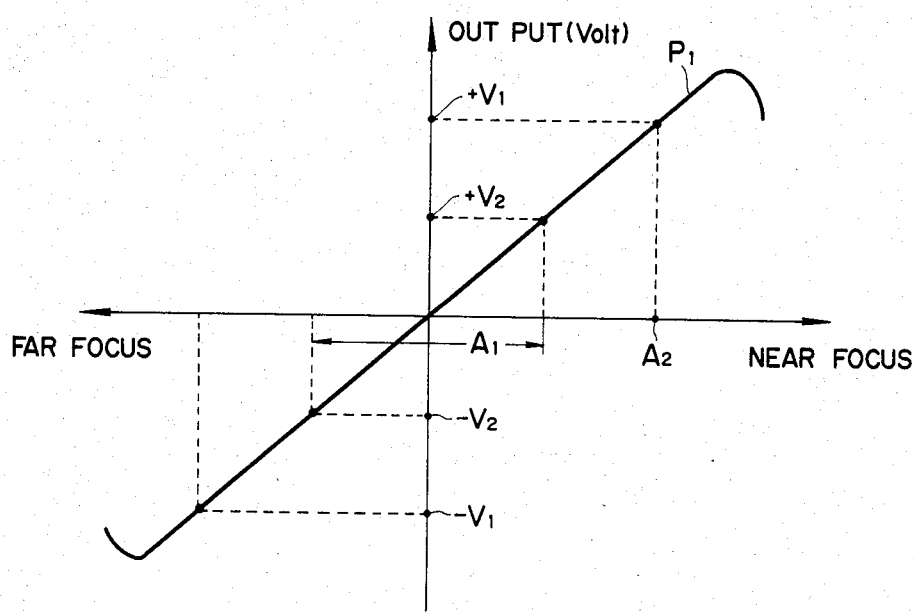
FIG. 1B is a diagram for explaining an output of a distance detection signal $P_1$ in the circuit shown in FIG. 1A.

FIGS. 1A and 1B show a first embodiment of the present invention. A reference numeral 1 denotes a distance detecting unit which outputs a distance detection signal $P_1$ and a data confirmation signal $P_2$. As shown in FIG. 1B, the distance detection signal $P_1$ put out from the distance detecting unit 1 is a signal corresponding to the location of the focusing lens. The data confirmation signal $P_2$ is a strobe signal indicative of the completion of one cycle of the distance detecting operation of the distance detecting unit 1.

The distance detection signal $P_1$ shown in FIG. 1B may be obtained by: focusing an image of an object to be photographed on an image sensor such as a CCD or the like; extracting electric charge accumulation signals at two points on the image sensor; performing the signal processing such as waveform shaping or the like for these two electric signals; and computing a differential signal between those two signals. The extraction of the distance detection signal $P_1$ may be executed by a well-known method which is disclosed, for example, in Japanese patent application Laid-open No. 76312/1980 or the like.

A reference numeral 100 denotes a comparison signal generating means including resistors 4, 5, 6, 7, and 8, and reference voltage signal sources $+V_{cc}$ and $-V_{cc}$. An output signal $+V_1$ represents a voltage level for setting a quasi-in-focus range on the near-focus side and is put out from a connection point between the resistors 4 and 5. An output signal $+V_2$ represents a voltage level for setting an in-focus range on the near-focus side and is put out from a connection point between the resistors 5 and 6. An output signal $-V_2$ represents a voltage level for setting an in-focus range on the far-focus side and is put out from a connection point between the resistors 6 and 7. An output signal $-V_1$ represents a voltage level for setting a quasi-in-focus range on the far-focus side and is put out from a connection point between the resistors 7 and 8.

A reference numeral 102 denotes quasi-in-focus state detecting means which comprises comparators 9 and 10 and a NOR gate 11. The level signal $+V_1$ of the quasi-in-focus range on the near-focus side is supplied to the inversion input terminal (−) of the comparator 9. The distance detection signal $P_1$ is applied to the non-inversion input terminal (+) thereof.

The distance detection signal $P_1$ is applied to the inversion input terminal (−) of the comparator 10 and the level signal $-V_1$ of the quasi-in-focus range on the far-focus side is applied to the non-inversion input terminal (+) thereof. Output signals from the comparators 9 and 10 are applied to the NOR gate 11, and its output terminal is connected to quasi-in-focus state continuation detecting means which will be described hereinlater.

A reference numeral 104 denotes in-focus state detecting means comprising comparators 12 and 13 and a NOR gate 14. The output level signal $+V_2$ representative of the in-focus range on the near-focus side is applied to the inversion input terminal ($-$) of the comparator 12, and the distance detection signal $P_1$ is applied to the non-inversion input terminal ($+$) thereof. The distance detection signal $P_1$ is input to the inversion input terminal ($-$) of the comparator 13, and the output level signal $-V_2$ indicating the in-focus range on the far-focus side is input to the non-inversion input terminal ($+$) thereof. Output signals from the comparators 12 and 13 are applied to the NOR gate 14, and its output terminal is connected to the above-mentioned quasi-in-focus state continuation detecting means.

The quasi-in-focus state continuation detecting means is designated by a numeral 106, which comprises a D-type flip flop 15 and an AND gate 16.

A circuit 108 for indicating the focusing state comprises inverters 21, 22 and 23, light emitting diodes 17, 18 and 19, a resistor 20, and a constant voltage power supply Vc. This circuit 108 functions to indicate three kinds of states, i.e., near-side deviation, quasi-in-focus and far-side deviation, respectively, in accordance with the outputs $Q_1$, $Q_2$ and $Q_3$ from the quasi-in-focus state continuation detecting means 106. The above-mentioned three states imply, respectively, that the focusing lens is positioned on the near-focus side with respect to the in-focus point, that it is in the quasi-in-focus state, and that it is on the far-focus side of the in-focus point.

The distance detection signal $P_1$ is also applied from the distance detecting unit 1 to an amplifier 2. As shown in FIG. 1B, for example, when the focusing lens is in a position $A_2$ on the near-focus side and out of a range $A_1$ of the in-focus state, the voltage signal $+V_1$ corresponding to the position $A_2$ is applied, so that the energization voltage to be applied to a motor M for driving the focusing lens is amplified through the amplifier 2, thereby controlling the energization.

Reference numerals 3 and 24 show OR gates, respectively. The OR gate 3 is connected to the amplifier 2. The OR gates 24 and 3 constitute operating control means for the amplifier 2. The OR gates 24 and 3 and the amplifier 2 provide drive control means for performing the drive control of the motor M.

Reference numeral 110 denotes auto-focus mode selecting means, which serves to select either of the two modes; a one-shot auto-focus mode, for example, an operational mode in which the distance detecting operation is performed once, in association with the release operation of a camera and the focusing lens is driven in accordance with the distance detecting operation; and a so-called servo-focus mode in which, if an object to be photographed moves continuously, in-focus signals are put out or the location of the object to be photographed is intermittently detected at predetermined timing to follow the movement of the object, thereby driving the focusing lens to the "in-focus" position. A switch 27 is connected between a reference signal level $V_b$ and a resistor 26, and a set-reset flip flop 25 is connected to the output terminal of the OR gate 24. The Q output terminal of the flip flop 25 is connected to the OR gate 3.

The operation of the circuit shown in FIG. 1A will be described hereinbelow. The distance detection signal $P_1$ from the distance detecting unit 1 is applied to each of the comparators 9, 10, 12 and 13 of the quasi-in-focus state detecting means 102 and the in-focus state detecting means 104, where each signal is compared with each of the comparison signals from the comparison signal generating means 100. Now assuming that the focusing lens locates, for example, on the near-focusing side from the position of the in-focus point, the distance detection signal $P_1$ indicating that the focus is in the near-focus side is output. Since the signal level of this distance detection signal $P_1$ is higher than the level signal $+V_1$ representative of the quasi-in-focus range on the near-focus side, the output signals of the comparators 9 and 12 become higher levels, while the output signals of the comparators 10 and 13 become lower levels. Hence, the outputs of the NOR gates 11 and 14 become lower levels and the data confirmation signal $P_2$ is applied to the quasi-in-focus state continuation detecting means 106, so that a higher-level signal is output to the output terminal $Q_1$ of the D-type flip flop 15. Therefore, the light emitting diode 17 lights up to indicate the near-side deviation in which the focus is deviated in the near-focus direction.

In case of the above-mentioned near-side deviation, namely, in the case where the distance detection signal $P_1$ is higher than the quasi-in-focus level $+V_1$, the outputs of the NOR gates 11 and 14 become lower levels. The input of the AND gate 16 is at a lower level, and therefore, the output of the AND gate 16 becomes lower level, so that the inputs of the OR gates 24 are also at lower levels.

If the selection switch 27 of the auto-focus mode selecting means 110 is turned off (that is to say, the one-shot auto-focus mode is selected), the set-reset flip flop 25 is reset, so that both inputs of the OR gate 3 become lower levels. Thus, the amplifier 2 amplifies the distance detection signal $P_1$, thereby driving through a motor M, the focusing lens (not shown) to an in-focus position. In case of one-shot auto-focus mode, the quasi-in-focus state and in-focus state detecting operations are executed once at every computation cycle of the distance detection signal, that is to say, synchronously with the data confirmation signal $P_2$.

When the lens is in the quasi-in-focus range, or when the lens having its focus on the near-focus side is moved into the quasi-in-focus range by the above-mentioned operation, and if the quasi-in-focus range is on the near-focus side, for example, the output level of the distance detection signal $P_1$ have a value between the level $+V_1$ representative of the quasi-in-focus on the near-focus side and the level $+V_2$ representative of the in-focus range on the near-focus side, put out from the comparison siganl generating means 100. Therefore, both outputs of the comparators 9 and 10 become lower levels and the NOR gate 11 is inverted to a higher level. The output of the comparator 12 becomes higher level and the output of the comparator 13 becomes the lower level. As a result, the output of the NOR gate 14 becomes lower level.

In response to the data confirmation signal $P_2$ from the distance detecting unit 1, only the output terminal $Q_2$ of the D-type flip flop 15 becomes a higher-level, so that the light emitting diode 22 lights up. At the same time, a higher-level signal is applied to the input terminal $D_4$ of the D-type flip flop 15. However, the output of the output terminal $Q_4$ remains at a lower level, so that the focus adjustment is continued.

If, due to the camera shake or the like, the lens is not fixed into the in-focus range but remains in the quasi-in-focus range even upon the succeeding quasi-in-focus and in-focus detecting operations, the higher-level signals are output from both output terminals $Q_2$ and $Q_4$ of the D flip flop 15 due to the input of the data confirmation signal $P_2$, causing the output of the AND gate 16 to be inverted into higher level. This higher-level signal is transmitted through the OR gates 24 and 3 to the amplifier 2, thereby inhibiting the output thereof. Hence, the operation of the lens driving motor M is stopped. In this case, when the selection switch 27 is turned off, the RS flip flop 25 is set due to the higher-level signal of the OR gate 24; so that the higher-level signal to be output from the output terminal Q of the RS flip flop 25 is effective to maintain the inhibition of output from the amplifier 2. If the selection switch 27 is turned on, the RS flip flop 25 is always reset and will not be set even if the output of OR gate 24 becomes higher level. Thus, if thereafter the lens deviates from the in-focus range, the focusing adjustment will be done again.

When the lens moves into the in-focus range, the comparators 12 and 13 output the lower-level signals and the output of the NOR gate 14 becomes higher level, so that the output of the amplifier 2 is inhibited and the lens driving operation is also stopped.

Figure 2:
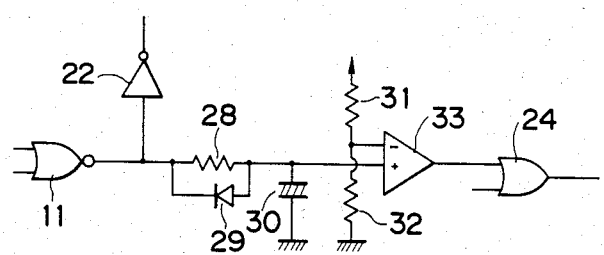
FIG. 2 shows a modified form of circuit of FIG. 1A, FIG. 1A embodiment, wherein, when a lens driving motor M is operated on the basis of a distance detection signal $P_1$, and if a signal from a distance detecting unit 1 represents that the lens is in the quasi-in-focus range, supply of the driving energy is stopped after a predetermined period of time has elapsed after the signal indicative of the quasi-in-focus range had been detected.

Although in the embodiment shown in FIG. 1, the quasi-in-focus state continuation is detected on the basis of the number of times of the quasi-in-focus state detection, this continuation may be detected on the basis of the time period. In other words, it may be detected by detecting whether the quasi-in-focus state continues for a predetermined time period. A modification in such a case will be shown in FIG. 2. As the quasi-in-focus state continuation detecting means, a resistor 28, a diode 29, a capacitor 30, division resistors 31 and 32, and a comparator 33 are used in place of the D flip flop 15 and the AND gate 16 of FIG. 1. When the lens is moved into the quasi-in-focus range, an output of the NOR gate 11 is inverted to higher level and this higher-level signal is integrated by the resistor 28 and capacitor 30. When the quasi-in-focus state continues for a predetermined time period, the integrated voltage exceeds the potential of division voltage of the division resistors 31 and 32. Thus, the comparator 33 outputs a higher-level signal to stop the lens driving operation. The diode 29 serves to allow the accumulated charges of the capacitor 30 to be discharged promptly in the case where the lens deviates from the quasi-in-focus range before the predetermined time period elapses.

Figure 3:
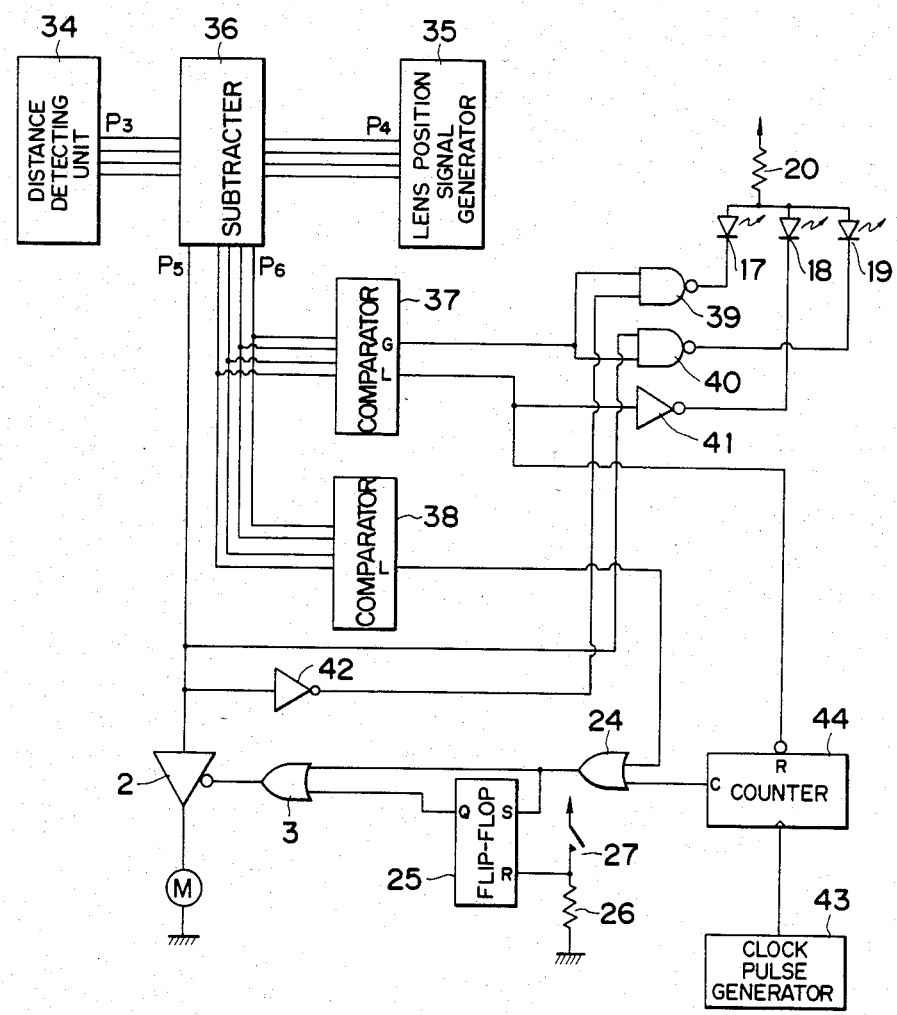
FIG. 3 is a circuit diagram showing another embodiment of the present invention.

FIG. 3 shows another embodiment of the present invention, in which similar parts and elements as those shown in FIG. 1 are designated by the same reference numerals. A distance detecting unit 34 is of a well-known type for outputting a distance signal $P_3$ represented by a digital code. A lens position signal generator 35 acts to generate a lens position signal $P_4$ which is represented by a digital code and corresponds to the distance or position of the lens. A subtracter 36 outputs both a focus state signal $P_5$ indicating the sign (positive or negative) of the difference between the distance signal $P_3$ and the lens position signal $P_4$ and outputs a signal $P_6$ representing an absolute value of the difference. A comparator 37 compares the signal $P_6$ with the level corresponding to the quasi-in-focus range. A comparator 38 compares the signal $P_6$ with the level corresponding to the in-focus range. Reference numerals 39 and 40 denote NAND gates, reference numerals 41 and 42 denote inverters; reference numeral 43 denotes a clock pulse generator; and reference 44 represents a counter. The clock pulse generator 43 and the counter 44 constitute an example of the quasi-in-focus state continuation detecting means.

Then, the operation of the circuit of FIG. 3 will be described. When the signal $P_6$ is larger than the level corresponding to the quasi-in-focus range, the comparator 37 outputs a higher-level signal from the terminal G. This output signal is transmitted to the NAND gate 39 or 40 which is opened or closed in accordance with the signal $P_5$ to energize the light emitting diode 17 or 19. In case of the near-side deviation, the diode 17 lights up, while, in case of the far-side deviation, the diode 19 lightsup. At the same time, the amplifier 2 acts to drive the lens driving motor M, and to perform the focusing adjustment.

When the signal $P_6$ is lower than the level corresponding to the quasi-in-focus range, the comparator 37 outputs a higher-level signal from the terminal L for allowing the light emitting diode 18 to light up, and at the same time, the reset of the counter 44 is cancelled. Thus, the counter 44 starts counting clock pulses and when the number of pulses corresponding to a predetermined time period has been counted a carry signal is output from the terminal C. This carry signal is applied through the OR gates 24 and 3 to the amplifier 2 to inhibit the output thereof. This causes the lens driving operation to be stopped.

In the embodiment shown in FIG. 3, the extent of the quasi-in-focus range for display is equal to that of the quasi-in-focus range for stopping the lens driving operation, but they may be different from each other.

The quasi-in-focus detecting means and the in-focus dectecting means may be modified in accordance with the type of distance detecting unit. The display device is not limited to the light emitting diode. The lens is not necessarily driven by a DC motor.

As described above, according to the present invention, when it is detected that the quasi-in-focus state continues for a predetermined time period or more, the quasi-in-focus state continuation detecting means functions to stop the lens driving operation, so that the stable focusing adjustment is ensured irrespective of camera shake or the like. Therefore, unnecessary lens driving operation can be prevented and the operability is improved.

What we claim is:

1. An automatic focus control system comprising:
  (a) distance detecting means for outputting a distance detective signal corresponding to a distance of an object to be photographed;
  (b) drive means for driving a focusing lens;
  (c) quasi-in-focus range detecting means for outputting, on the basis of the distance detection signal from said distance detecting means, a signal indicative of whether or not the focusing lens is in a quasi-in-focus range;
  (d) in-focus range detecting means for outputting, on the basis of the distance signal from said distance detecting means, a signal indicative of whether or not the focusing lens is in-focus; and
  (e) quasi-in-focus range continuation detecting means having memory means for receiving the output signal from said quasi-in-focus range detecting means indicating that said focusing lens is in the quasi-in-focus state and for outputting a control signal when said memory means receives a plurality of signals indicating that said focusing lens is in the quasi-in-focus range;
  wherein said drive means is controlled on the basis of the control signal from said memory means.

2. An automatic focus control system comprising:

(a) distance detecting means for outputting a distance detection signal corresponding to a distance of an object to be photographed;
(b) drive means for driving a focusing lens;
(c) quasi-in-focus range detecting means for outputting, on the basis of the distance detection signal from said distance detecting means, a signal indicative of whether or not the focusing lens is in a quasi-in-focus range
(d) in-focus range detecting means for outputting, on the basis of the distance signal from said distance detecting means, a signal indicative of whether or not the focusing lens is in-focus; and
(e) quasi-in-focus range continuation detecting means having time-constant means for receiving the output signal from said quasi-in-focus range detecting means indicating that said focusing lens is in the quasi-in-focus range and for outputting a control signal after the predetermined time, said drive means being stopped in accordance with the control signal from said time-constant means.

3. An automatic focus control system comprising:

(a) distance detecting means for outputting a distance signal corresponding to a distance of an object to be photographed;
(b) lens position signal generator means for outputting a signal corresponding to a position of a focusing lens;
(c) drive means for driving a focusing lens;
(d) means for receiving the output of said lens position signal generator means and the output signal from said distance detecting means to output a focus state signal;
(e) first means, based on the focus state signal, for outputting a signal indicating that said focusing lens is in the quasi-in-focus range;
(f) second means, based on the focus state signal, for outputting a signal indicating that said focusing lens is in-focus; and
(g) time control means for receiving the signal from said first means and for stopping the energization of said drive means after a predetermined time from the receipt of the signal from said first means.

* * * * *

UNITED STATES PATENT AND TRADEMARK OFFICE
CERTIFICATE OF CORRECTION

PATENT NO. : 4,538,892

DATED : September 3, 1985

INVENTOR(S) : SHINJI SAKAI, ET AL.

It is certified that error appears in the above-identified patent and that said Letters Patent is hereby corrected as shown below:

Column 1, line 14, "is" should read --in--;
         line 15, "in" should read --is--.

Column 4, line 24, between "input" and "of" insert --$Q_2$--;
         line 49, "siganl" should read --signal--;
         line 53, delete "the" (third occurrence);
         line 64, delete "the" (first occurrence).

Column 6, line 10, "lightsup" should read --lights up--;
         line 46, (Claim 1), "detective" should read --detection--.

Column 7, line 9, after "range" insert -- ; --.

Column 8, line 1, after "distance", second occurrence, should read -- detection --.

Signed and Sealed this

Twenty-second Day of July 1986

[SEAL]

Attest:

DONALD J. QUIGG

Attesting Officer      Commissioner of Patents and Trademarks